United States Patent
Basel et al.

(10) Patent No.: US 9,449,281 B2
(45) Date of Patent: Sep. 20, 2016

(54) STATISTICAL MACHINE LEARNING

(75) Inventors: Binyamin Basel, Hod Hasharon (IL); Yizhak Idan, Herzelia (IL)

(73) Assignee: SAP SE, Walldorf (DE)

( * ) Notice: Subject to any disclaimer, the term of this patent is extended or adjusted under 35 U.S.C. 154(b) by 1032 days.

(21) Appl. No.: 12/347,667

(22) Filed: Dec. 31, 2008

(65) Prior Publication Data
US 2010/0169245 A1    Jul. 1, 2010

(51) Int. Cl.
G06N 99/00        (2010.01)

(52) U.S. Cl.
CPC ................... G06N 99/005 (2013.01)

(58) Field of Classification Search
None
See application file for complete search history.

(56) References Cited

U.S. PATENT DOCUMENTS

| | | | |
|---|---|---|---|
| 7,603,331 B2 * | 10/2009 | Tuzhilin et al. | 706/45 |
| 7,885,902 B1 * | 2/2011 | Shoemaker et al. | 705/319 |
| 2008/0294622 A1 * | 11/2008 | Kanigsberg et al. | 707/5 |

* cited by examiner

Primary Examiner — Kakali Chaki
Assistant Examiner — Daniel Pellett
(74) Attorney, Agent, or Firm — Fish & Richardson P.C.

(57) ABSTRACT

Statistical machine learning, in which an input module receives user input that defines a hypothesis associated with a particular output. The hypothesis defines one or more starting criteria that are proposed as being correlated with the particular output, and a recommendation engine initially provides recommendations that include the particular output based on the one or more starting criteria defined by the hypothesis. An experience analytics system receives feedback data related to whether the recommendations provided based on the one or more starting criteria defined by the hypothesis were successful and modifies the hypothesis based on the feedback data. Subsequent to the experience analytics system modifying the hypothesis, the recommendation engine provides recommendations that include the particular output based on the modified hypothesis.

18 Claims, 8 Drawing Sheets

500

| | 510 | 520 | 530 |
|---|---|---|---|
| | CRITERIA | ACCEPT | DECLINE |
| 540 | Criteria X Only | 40% | 60% |
| 545 | Criteria Y Only | 5% | 95% |
| 550 | Criteria Z Only | 50% | 50% |
| 555 | Criteria X and Y | 15% | 85% |
| 560 | Criteria X and Z | 75% | 25% |
| 565 | Criteria Y and Z | 10% | 90% |
| 570 | Criteria X, Y, and Z | 20% | 80% |

Starting Attributes – Attribute X, Attribute Y, and Attribute Z — 710

Initial Hypothesis – X = 1.0, Y = 0.5, and Z = 0.5 — 720

| RESULT | MATCHING ATTRIBUTES | RECOMMEND? | DECISION | ADAPTED HYPOTHESIS |
|---|---|---|---|---|
| 1 | X | Yes | Accept | X = 1.1, Y = 0.5, and Z = 0.5 |
| 2 | Y, Z | Yes | Accept | X = 1.1, Y = 0.6, and Z = 0.6 |
| 3 | Y | No | N/A | X = 1.1, Y = 0.6, and Z = 0.6 |
| 4 | X, Z | Yes | Decline | X = 1.0, Y = 0.6, and Z = 0.5 |
| 5 | Y, Z | Yes | Decline | X = 1.0, Y = 0.5, and Z = 0.4 |
| 6 | Y, Z | No | N/A | X = 1.0, Y = 0.5, and Z = 0.4 |
| 7 | X, Y | Yes | Accept | X = 1.1, Y = 0.6, and Z = 0.4 |
| 8 | Y, Z | Yes | Accept | X = 1.1, Y = 0.7, and Z = 0.5 |
| 9 | X | Yes | Decline | X = 1.0, Y = 0.7, and Z = 0.5 |
| 10 | X, Z | Yes | Decline | X = 0.9, Y = 0.7, and Z = 0.4 |
| 11 | Y, Z | Yes | Accept | X = 0.9, Y = 0.8, and Z = 0.5 |
| 12 | X | No | N/A | X = 0.9, Y = 0.8, and Z = 0.5 |
| 13 | X, Y, Z | Yes | Accept | X = 1.0, Y = 0.9, and Z = 0.6 |
| 14 | X, Y | Yes | Accept | X = 1.1, Y = 1.0, and Z = 0.6 |
| 15 | Y | Yes | Accept | X = 1.1, Y = 1.1, and Z = 0.6 |

FIG. 7

STATISTICAL MACHINE LEARNING

TECHNICAL FIELD

This description generally relates to statistical machine learning.

BACKGROUND

Computer systems often are used to manage and process data. Application programs also may be used for analyzing data, including analyzing data obtained through transaction processing systems. In many cases, the data needed for analysis may have been produced by various transaction processing systems and may be located in many different data management systems. Analytical processing may be used to analyze data and identify relationships in data stored in a data warehouse or another type of data repository.

SUMMARY

In one aspect, a statistical machine learning system includes an input module configured to receive user input that defines a hypothesis associated with a particular output. The hypothesis defines one or more starting criteria that are proposed as being correlated with the particular output. The system also includes at least one electronic data store configured to store data representative of the hypothesis defined by the user input and a recommendation engine configured to access the data representative of the hypothesis and provide, during a first period of time, recommendations that include the particular output based on the one or more starting criteria defined by the hypothesis. The system further includes an experience analytics system configured to receive, from an application system, feedback data related to whether the recommendations provided based on the one or more starting criteria defined by the hypothesis were successful and modify the hypothesis based on the feedback data received from the application system. The recommendation engine is further configured to, subsequent to the experience analytics system modifying the hypothesis, provide, during a second period of time that is subsequent to the first period of time, recommendations that include the particular output based on the modified hypothesis.

Implementations may include one or more of the following features. For example, the experience analytics system may be configured to modify the hypothesis based on the feedback data received from the application system by determining whether the one or more starting criteria are correlated with the particular output based on the feedback data received from the application system. The experience analytics system also may be configured to modify the hypothesis based on the feedback data received from the application system by, in response to a determination that a particular combination of starting criteria is correlated with the particular output, using the particular combination of criteria and the recommendation engine may be configured to provide recommendations that include the particular output based on the modified hypothesis by providing recommendations using the particular combination of criteria.

In some examples, the experience analytics system may be configured to modify the hypothesis based on the feedback data received from the application system by, in response to a determination that a particular starting criterion is not correlated with the particular output, removing the particular starting, criterion from the hypothesis. In these examples, the recommendation engine may be configured to provide recommendations that include the particular output based on the modified hypothesis by providing recommendations without regard for the particular starting criterion removed from the hypothesis.

In some implementations, the input module further may be configured to receive user input that defines one or more declarative rules associated with the particular output. The one or more declarative rules may define one or more required criteria that is different than the one or more starting criteria defined by the hypothesis and that is required to be met in order to provide a recommendation including the particular output. The recommendation engine may be configured to provide recommendations by providing recommendations that include the particular output conditioned on the one or more required criteria being met. In these implementations, the recommendation engine may be configured to provide recommendations that include the particular output conditioned on the one or more required criteria being met by providing recommendations based on the one or more starting criteria defined by the hypothesis only when the one or more required criteria are met.

The experience analytics system may be configured to modify the hypothesis based on the feedback data received from the application system by identifying, from the received feedback data, feedback data related to the one or more starting criteria defined by the hypothesis and analyzing the identified feedback data related to the one or more starting criteria defined by the hypothesis. Based on the analysis, the experience analytics system may determine whether the identified feedback data is sufficient to establish a rule related to the one or more starting criteria defined by the hypothesis. In response to a determination that the identified feedback data is sufficient to establish a rule related to the one or more starting criteria defined by the hypothesis, the experience analytics system may establish a rule for providing recommendations associated with the particular output based on the analysis. In response to a determination that the identified feedback data is not sufficient to establish a rule related to the one or more starting criteria defined by the hypothesis, the experience analytics system may continue monitoring feedback data that is received from the application system and that is related to whether recommendations provided based on the one or more starting criteria defined by the hypothesis were successful. The recommendation engine may be configured to provide recommendations that include the particular output based on the modified hypothesis by, in response to a determination that the identified feedback data is sufficient to establish a rule related to the one or more starting criteria defined by the hypothesis, providing recommendations that include the particular output based on the established rule.

The experience analytics system may be configured to modify the hypothesis based on the feedback data received from the application system by accessing a single instance of feedback data, identifying one or more criteria in the single instance of feedback data that match the one or more starting criteria defined by the hypothesis, and incrementally modifying the hypothesis based on the one or more criteria in the single instance of feedback data that match the one or more starting criteria defined by the hypothesis. The recommendation engine may be configured to provide recommendations that include the particular output based on the modified hypothesis by providing a next recommendation based on the incrementally-modified hypothesis.

In some examples, the input module may be configured to receive user input that defines a hypothesis associated with a particular output by receiving user input that defines a hypothesis associated with a particular offer. The hypothesis may define one or more starting user attributes that are proposed as being correlated with user acceptance of the particular offer. In these example, the recommendation engine may be configured to provide, during the first period of time, recommendations that include the particular output based on the one or more starting criteria defined by the hypothesis by accessing attributes of a user available to receive an offer and comparing the accessed attributes of the user to the one or more starting user attributes defined by the hypothesis. Based on comparison results, the recommendation engine may determine whether at least a portion of the accessed attributes of the user match at least a portion of the one or more starting user attributes defined by the hypothesis and may provide the particular offer to the user in response to a determination that at least a portion of the accessed attributes of the user match at least a portion of the one or more starting user attributes defined by the hypothesis. The experience analytics system may be configured to receive, from an application system, feedback data related to whether the recommendations provided based on the one or more starting criteria defined by the hypothesis were successful by receiving, from an application system, feedback data related to whether the user accepted the particular offer and the experience analytics system may be configured to modify the hypothesis based on the feedback data received from the application system by modifying the hypothesis based on whether the user accepted the particular offer and the attributes of the user.

In another aspect, a computer-implemented method of statistical machine learning includes receiving user input that defines a hypothesis associated with a particular output. The hypothesis defines one or more starting criteria that are proposed as being correlated with the particular output. The method also includes storing, in electronic storage, data representative of the hypothesis defined by the user input and providing, during a first period of time, recommendations that include the particular output based on the one or more starting criteria defined by the hypothesis. The method further includes receiving, from an application system, feedback data related to whether the recommendations provided based on the one or more starting criteria defined by the hypothesis were successful and modifying, using a processor, the hypothesis based on the feedback data received from the application system. Subsequent to modifying the hypothesis, the method includes providing, during a second period of time that is subsequent to the first period of time, recommendations that include the particular output based on the modified hypothesis.

Implementations may include one or more of the following features. For example, the method may include determining whether the one or more starting criteria are correlated with the particular output based on the feedback data received from the application system. The method may include, in response to a determination that a particular combination of starting criteria is correlated with the particular output, using the particular combination of criteria and providing recommendations using the particular combination of criteria.

In some examples, the method may include, in response to a determination that a particular starting criterion is not correlated with the particular output, removing the particular starting criterion from the hypothesis. In these examples, the method may include providing recommendations without regard for the particular starting criterion removed from the hypothesis.

In some implementations, the method may include receiving user input that defines one or more declarative rules associated with the particular output. The one or more declarative rules may define one or more required criteria that is different than the one or more starting criteria defined by the hypothesis and that is required to be met in order to provide a recommendation including the particular output. The method also may include providing recommendations that include the particular output conditioned on the one or more required criteria being met. In these implementations, the method may include providing recommendations based on the one or more starting criteria defined by the hypothesis only when the one or more required criteria are met.

The method may include identifying, from the received feedback data, feedback data related to the one or more starting criteria defined by the hypothesis and analyzing the identified feedback data related to the one or more starting criteria defined by the hypothesis.

The method also may include, based on the analysis, determining whether the identified feedback data is sufficient to establish a rule related to the one or more starting criteria defined by the hypothesis and, in response to a determination that the identified feedback data is sufficient to establish a rule related to the one or more starting criteria defined by the hypothesis, establishing a rule for providing recommendations associated with the particular output based on the analysis and providing recommendations that include the particular output based on the established rule. The method further may include, in response to a determination that the identified feedback data is not sufficient to establish a rule related to the one or more starting criteria defined by the hypothesis, continuing to monitor feedback data that is received from the application system and that is related to whether recommendations provided based on the one or more starting criteria defined by the hypothesis were successful.

The method may include accessing a single instance of feedback data, identifying one or more criteria in the single instance of feedback data that match the one or more starting criteria defined by the hypothesis, and incrementally modifying the hypothesis based on the one or more criteria in the single instance of feedback data that match the one or more starting criteria defined by the hypothesis. The method also may provide a next recommendation based on the incrementally-modified hypothesis.

In some examples, the method may include receiving user input that defines a hypothesis associated with a particular offer. The hypothesis may define one or more starting user attributes that are proposed as being correlated with user acceptance of the particular offer. The method also may include accessing attributes of a user available to receive an offer and comparing the accessed attributes of the user to the one or more starting user attributes defined by the hypothesis. The method further may include, based on comparison results, determining whether at least a portion of the accessed attributes of the user match at least a portion of the one or more starting user attributes defined by the hypothesis and providing the particular offer to the user in response to a determination that at least a portion of the accessed attributes of the user match at least a portion of the one or more starting user attributes defined by the hypothesis. The method may include receiving, from an application system, feedback data related to whether the user accepted the particular offer and modifying the hypothesis based on whether the user accepted the particular offer and the attributes of the user.

In another aspect, at least one computer-readable storage medium is encoded with executable instructions that, when executed by a processor, cause the processor to perform operations. The operations include receiving user input that defines a hypothesis associated with a particular output. The hypothesis defines one or more starting criteria that are proposed as being correlated with the particular output. The operations also include storing, in electronic storage, data representative of the hypothesis defined by the user input and providing, during a first period of time, recommendations that include the particular output based on the one or more starting criteria defined by the hypothesis. The operations further include receiving, from an application system, feedback data related to whether the recommendations provided based on the one or more starting criteria defined by the hypothesis were successful and modifying, using a processor, the hypothesis based on the feedback data received from the application system. The operations include, subsequent to modifying the hypothesis, providing, during a second period of time that is subsequent to the first period of time, recommendations that include the particular output based on the modified hypothesis.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DESCRIPTION OF DRAWINGS

FIGS. 5 and 7 are exemplary data sets.

DETAILED DESCRIPTION

Figure 1:
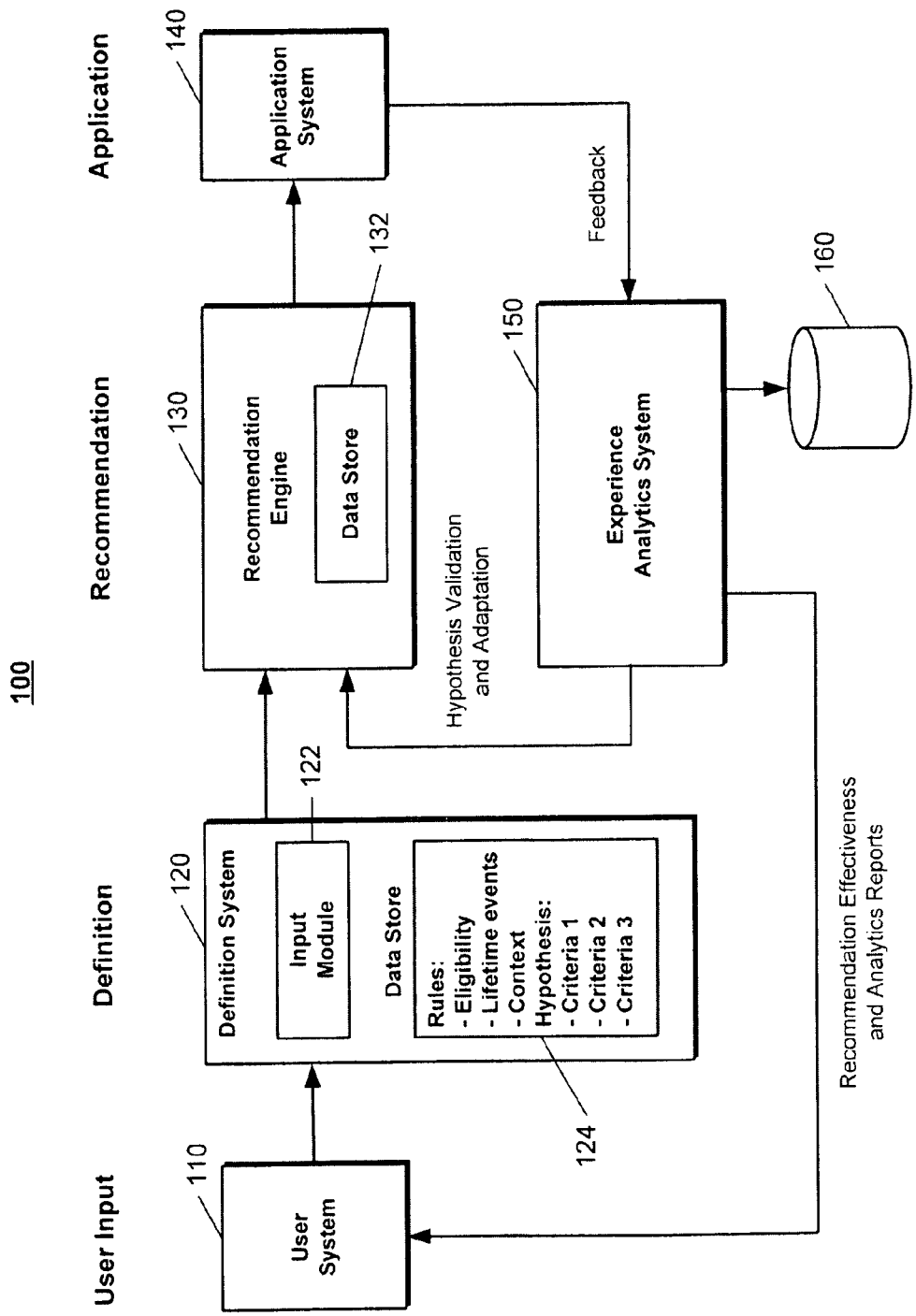
FIGS. 1, 2, and 8 are diagrams of exemplary systems.

In some implementations, statistical machine learning or decision intelligence technology is initiated using a hypothesis that is defined based on existing knowledge. The hypothesis represents an educated guess related to the criteria or factors that will be successful in a decision support process (e.g., a recommendation process, a decision making process, etc.). Accordingly, the hypothesis defines a starting point for the decision support process (e.g., the recommendation process) and initial decisions (e.g., recommendations) are made using the hypothesis. Over time, the decisions made using the hypothesis are evaluated and the hypothesis is fine tuned/adapted based on real-time learning (e.g., using techniques similar to data mining). By starting with a hypothesis, the decision support process takes advantage of existing knowledge and intuition and is able to learn from the hypothesis, rather than learning from scratch.

Starting a decision support process (e.g., a recommendation process) with a hypothesis may offer advantages over other types of decision support processes. For instance, rule-based engines or expert systems (e.g., declarative approaches) harvest knowledge of experts and apply the knowledge of the expert in a set of rules. As such, in a rule-based engine or expert system, an expert is needed to define a set of rules. However, in some situations, an expert may not be available (or may be too expensive to justify) or the solution cannot be formulated as an exact combination of rules and conditions (e.g., when the solution is unknown or is changing with time in a non-stationary manner). In these situations, starting with a hypothesis may take advantage of some intuition (although, not necessarily an expert's intuition) and the hypothesis may be validated and adapted over time based on feedback received from using the hypothesis. Accordingly, the decision support process using the hypothesis may have lower start up costs to implement than a rule-based engine or expert system and may still offer some (if not all) of the benefit of a person's intuition regarding a decision support process.

In addition, in a rule-based engine or expert system, the set of rules does not adapt over time for changing circumstances and, therefore, may suffer stagnation and from necessity of costly frequent analysis and maintenance (e.g., to modify the rules to represent the change in circumstances). The same stagnation may not result in a hypothesis-based system because the hypothesis is automatically adapted over time and fine-tuned based on real-time learning of decision results made using the hypothesis.

In another example, statistical approaches examine collected data related to a decision support process (e.g., a recommendation process) and infer decisions (e.g., recommendations) by attempting to correlate the data and the results that are trying to be achieved (e.g., using data mining technology). A statistical approach, however, suffers from a cold start in that a sufficient amount of the data that is needed to adequately find a statistically sound correlation is not available for a relatively long time after the decision support process begins. This type of cold start may not be acceptable in a fast changing and competitive industry. The decision support process using the hypothesis may not suffer from a cold start because decisions (e.g., recommendations) are effective immediately using the hypothesis.

Moreover, the decision support process using the hypothesis may leverage existing knowledge, experience or business policies, which cannot be extracted by a statistical approach. By leveraging existing knowledge and experience, the processes of validating and adapting the hypothesis may be less time consuming and less computationally intensive than a statistical approach that starts from scratch or that looks for correlations in high-dimensional data. Because the validation and adaptation processes focus on the hypothesis (e.g., the criteria and factors defined by the hypothesis), the entire universe of data may not be examined and focus may be given to the criteria and factors defined by the hypothesis.

A decision support process using a hypothesis, therefore, may be applicable where an expert is not available (or is too costly), a cold start is a problem, and adaptation is beneficial. By starting with a hypothesis, existing business knowledge and intuition is leveraged and the decision support process complies with business policies. Because the hypothesis is automatically adapted based on real-time learning, tight maintenance may not be required and the decision support process is measurable and controllable in that users can understand performance/short-comings and improve strategy. In addition, using a hypothesis may have enhanced maintainability because it does not explode into volumes of data and enables ease of strategic maintenance. Using a hypothesis in a decision support process may be beneficial in customer relationship management systems, service management systems, collections improvement systems, online marketing and sales systems, and fraud detection systems.

Referring to FIG. 1, a statistical machine learning system 100 includes a user system 110, a definition system 120, a recommendation engine 130, an application system 140, an experience analytics system 150, and an electronic data store 160. The system 100 is configured to implement a decision support process (e.g., a recommendation process) that starts from a hypothesis. In particular, the user system 110 may receive user input defining a hypothesis and send the information defining the hypothesis to the definition system 120. The definition system 120 includes an input module 122 that receives (e.g., over a network or other electronic connection) the information defining the hypothesis and stores data representative of the hypothesis in a data store 124. The data representative of the hypothesis may define one or more criteria (e.g., user attributes, product attributes, timing factors, etc.) that are used by a decision support process to make a decision or recommendation.

The input module 122 also may receive information defining a set of rules (e.g., rules that are not adapted based on feedback) from the user system 110 and store data representative of the set of rules in the data store 124. The set of rules may include eligibility rules (e.g., only certain individuals (e.g., adults) are eligible for an offer), lifetime events, context information (e.g., an offer is available in only a particular context (e.g., over the phone, over a computer, in person, etc.)), etc. The input module 122 may directly receive user input that defines the hypothesis and/or set of rules, rather than receiving the information from the user system 110.

After the definition system 120 defines the parameters (e.g., set of rules and hypothesis) of the recommendation process, the parameters (e.g., set of rules and hypothesis) are sent to the recommendation engine 130 for use in a recommendation process. For instance, the recommendation engine 130 executes a recommendation process that determines whether or not to provide a particular recommendation in a specific situation and may select, from among multiple possible recommendations, the best available recommendations. In doing so, the recommendation engine 130 compares characteristics of the specific situation (e.g., user attributes of a user in a position to receive an offer, environment in which the offer may be delivered, etc.) to the set of rules and the criteria defined by the hypothesis. If the set of rules are not satisfied by the specific situation, the output (e.g., the recommendation or offer) corresponding to the set of rules is not provided by the recommendation engine 130. If the set of rules are satisfied by the specific situation, the recommendation engine 130 considers the hypothesis in determining whether or not to provide the output (e.g., the recommendation or offer) corresponding to the hypothesis. For instance, if the specific situation satisfies the rule defined for multiple outputs or offers, the recommendation engine 130 compares characteristics of the specific situation to the multiple hypotheses corresponding to the multiple outputs or offers and selects the output or offer whose corresponding hypothesis most closely matches the characteristics of the specific situation.

The recommendation engine 130 may store the parameters (e.g., set of rules and hypothesis) received from the definition system 120 in the data store 132. The data store 132 may store the same data as stored in the data store 124 and may store additional data that is used by the recommendation engine 130 in performing the recommendation process. For example, the data store 132 may store executable instructions that define the operations performed in the recommendation process.

When the recommendation engine 130 selects an output of the recommendation process, the recommendation engine 130 provides the output to the application system 140. After receiving the output, the application system 140 processes the output and may apply the recommendation provided by the recommendation engine 130. For instance, when the output is a recommended offer and the application system 140 includes a call center, the application system 140 may display the offer to an operator of the call center and the operator may present the offer to a customer.

The application system 140 provides, to the experience analytics system 150, feedback data related to success/failure of recommendations made by the recommendation engine 130. In some implementations, the application system 140 may provide feedback data related to success/failure of recommendations made by the recommendation engine 130 directly to the recommendation engine 130. In these implementations, the recommendation engine 130 may store the feedback data in the data store 132 and/or may send the feedback data to the experience analytics system 150 for processing.

When the output provided by the recommendation engine 130 is a recommended offer, the feedback data may indicate whether or not the recommended offer was accepted by the user to which the offer was made. In addition, the feedback data may indicate characteristics of the situation in which the offer was made and attributes of the user to which the offer was made. The characteristics of the situation and attributes of the user may include all characteristics/attributes known by the application system 140 or may only include the characteristics/attributes that are relevant to the hypothesis corresponding to the offer. The feedback data further may indicate whether an offer (e.g., any offer or a particular offer) was made at all and/or whether the customer expressed interest in the offer, but did not actually accept the offer (e.g., the user clicked on the offer or put it into an online shopping basket, but abandoned the purchasing process prior to actually accepting the offer).

The experience analytics system 150 receives the feedback data and performs hypothesis validation and adaptation using the feedback data. For example, the experience analytics system 150 may identify criteria in the feedback data that are relevant to the hypothesis and evaluate whether the hypothesis is correct for those criteria. In this example, the hypothesis may predict that males are likely to accept a particular offer and the experience analytics system 150 may identify males presented with the offer, determine the acceptance rate of males presented with the offer, compare the acceptance rate of males with an average acceptance rate in general, and determine whether the prediction of the hypothesis (that males are more likely to accept the offer) is correct. If the experience analytics system 150 determines that males are more likely to accept the offer, that portion of the hypothesis is validated and may be established as a rule (e.g., only males are presented with the offer going forward). If the experience analytics system 150 determines that males are not more likely to accept the offer, that portion of the hypothesis is not validated and may be changed by the experience analytics system 150 (e.g., the male criterion of the hypothesis may be removed and no longer used to impact recommendation of the offer). If the experience analytics system 150 determines that the results are inconclusive, the experience analytics system 150 may continue to track feedback data and evaluate the feedback data with respect to the hypothesis.

In some implementations, the experience analytics system 150 evaluates $2^n$ predictors, where n is the number of criteria defined in the hypothesis. For example, if the only hypothesis is that males are more likely to accept an offer, the experience analytics system 150 calculates the response for males and the general average response. In this example, the recommendation or offer may be presented from the beginning to determine the average response and the response from males. If the experience analytics system 150, determines that, over time, the males' response is statistically different than the "average," the experience analytics system 150 provides hypothesis validation and adaptation data to the recommendation engine 130. Based on the hypothesis validation and adaptation data, the recommendation engine 130 starts using two predictors in the recommendation process. Specifically, the recommendation engine 130 uses a male-specific predictor that is used in determining whether to make the recommendation to males and an average predictor that is used in determining whether to make the recommendation to all others (e.g., non-males). The male-specific predictor is weighted differently than the average predictor such that the recommendation is made to males more frequently than the average population when the hypothesis has been validated. The average predictor is used for the average population that does not fit the male criteria and, therefore, removes the male influence in determining whether to make the recommendation.

In some examples, the experience analytics system 150 automatically, without human intervention, adapts the hypothesis based on the feedback data. In these examples, the experience analytics system 150 may evaluate each instance of feedback data received and incrementally adapt the hypothesis based on each instance of feedback data. The experience analytics system 150 also may monitor and track feedback data over time and adapt the hypothesis based on the tracked feedback data. For instance, as soon as the tracked feedback data indicates that one or more criteria of the hypothesis should be validated or adapted (e.g., a percentage of offer acceptances for a given criterion decreases below a threshold, a threshold amount of feedback data for a given criterion has been received, etc.), the experience analytics system 150 triggers a hypothesis validation and/or adaptation process.

When the experience analytics system 150 validates or adapts the hypothesis, the experience analytics system 150 provides hypothesis data reflecting the validation or adaptation to the recommendation engine 130. The recommendation engine 130 executes the recommendation process based on the hypothesis (e.g., uses an adapted hypothesis to make future recommendations).

The experience analytics system 150 further provides recommendation effectiveness and analytics reports to the user system 110. The recommendation effectiveness and analytics reports may indicate the rate of success for particular recommendations and provide rate of success data based on the criteria defined by the hypothesis. The user system 110 may display the recommendation effectiveness and analytics reports and a user may adjust the hypothesis based on the reports.

The electronic data store 160 may be a database and may store information tracked by the experience analytics system 150. The electronic data store 160 may store all of the feedback data received, feedback data received within a particular threshold period of time, results of analytic processing by the experience analytics system 150, and hypothesis and rule data (e.g., adaptations to the hypothesis) used by the recommendation engine 130. The electronic data store 160 also may store the time of recommendations and all of the information that was relevant in making the decision to provide the recommendation, such as the profile of the customer at the moment of interaction. The experience analytics system 150 may access feedback/analytical results data from the electronic data store 160 to perform hypothesis validation and adaptation. The experience analytics system 150 also may access hypothesis data (e.g., adaptations to the hypothesis) from the electronic data store 160 and provide the hypothesis data to the recommendation engine 130.

To illustrate operations of the system 100, suppose the output provided by the recommendation engine 130 is an offer to sell a new cellular telephone to owners of old cellular phones. A manufacturer or retailer of the new cellular telephone may use the user system 110 to input the offer into the system 100 and define a hypothesis for the offer. The hypothesis may be that the offer for the new cellular telephone will be well received by younger people (e.g., ages 13-22), people from the northern United States, and people employed by the military.

The definition system 120 defines the hypothesis as inputted by the manufacturer or retailer and the recommendation engine 130 begins recommending the offer based on the hypothesis. For instance, the recommendation engine 130 may recommend the offer to a person including any one or more of the three criteria defined in the hypothesis (e.g., recommend to a younger person, a person from the northern United States, or a person employed by the military). The recommendation engine 130 may recommend the offer to all customers that are eligible (e.g., all customers that own an old cellular phone) and track all possible combinations of the criteria defined in the hypothesis.

The application system 140 presents the offer based on recommendations provided by the recommendation engine 130 and provides feedback data to the experience analytics system 150 that indicates whether or not a person presented with the offer accepted the offer (e.g., the feedback data may indicate that a younger person accepted the offer, but a person employed by the military did not).

The experience analytics system 150 compares the feedback data to the hypothesis and determines whether the hypothesis is correct for each of the three criteria defined by the hypothesis. Based on the analysis of the feedback data, the experience analytics system 150 validates and adapts the hypothesis. For example, when the feedback data indicates that younger people and people from the northern United States are more likely to accept the offer (e.g., more likely than the general population to accept the offer), but that people employed by the military are not more likely to accept the offer (perhaps, even less likely than the general population), the experience analytics system 150 adapts the hypothesis to decrease the likelihood that people employed by the military will be presented with the offer. The experience analytics system 150 also may adapt the hypothesis to exclude people employed by the military such that people employed by the military are no longer recommended for the offer. The recommendation engine 130 provides subsequent recommendations for the offer based on the modified hypothesis (e.g., recommend to a younger person, a person from the northern United States, but not to a person employed by the military).

In some implementations, the experience analytics system 150 also may consider combinations of criteria defined by the hypothesis. The experience analytics system 150 may test all combinations of criteria defined by the hypothesis and the averages for each combination as compared to an average of the general population. For instance, the experience analytics system 150 may determine that people that meet both the criteria of younger people and people from the northern United States are the most likely to accept the offer. Accordingly, the experience analytics system 150 may define a rule that only younger people from the northern United States are presented with the offer. The recommendation engine 130 may apply the rule in future recommendations.

One or more of the components of the system 100 (e.g., the user system 110, the definition system 120, the recommendation engine 130, the application system 140, and the experience analytics system 150) each may be a general-purpose computer (e.g., a desktop personal computer, a workstation, or a laptop computer) that is configured to communicate with other devices over a network. In some implementations, one or more of the components may be mobile or wireless devices. One or more of the components also may be special purpose computers or hardware devices, such as processors. One or more of the components further may be executable programs that are implemented in hardware. Although the system 100 has been defined as separate components, all of the components may be part of a single system or computer, additional components may be included in the system, and a subset of the components may be used to perform the operations of the system 100.

Figure 2:
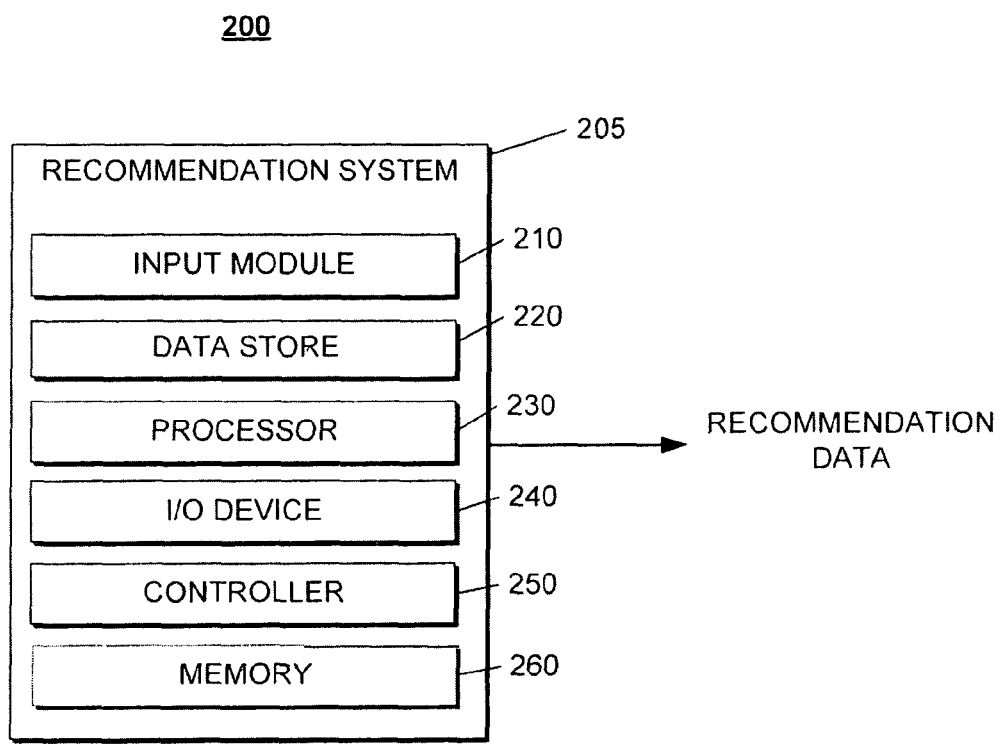

Referring to FIG. 2, a block diagram 200 of a recommendation system 205 is shown. The system 205 includes an input module 210, a data store 220, a processor 230, an I/O device 240, a controller 250, and a memory 260. The recommendation system 205 may be used to provide recommendations starting from a hypothesis and adapt the hypothesis based on feedback data collected from previous recommendations. The recommendation system 205 may be implemented within hardware or a combination of hardware and software.

The input module 210 imports data associated with a process. The data may include data resulting from a particular process (e.g., hypothesis data and/or feedback data). The data also may be received over a network or input by a user.

The data may include data acquired from outside of the process. In some implementations, the input module 210 receives data from a source external to the system 205. The input module 210 also may receive data from a source within the system 205, and further may access data, either from within the system 205 or from a source external to the system 205. In some implementations, the input module 210 reformats and/or transforms the data such that the data may be processed and stored by other components within the system 205.

The recommendation system 205 also includes a data store 220. In some implementations, data from the input module 210 is stored in the data store 220. The data store 220 may be, for example, a relational database that logically organizes data into a series of database tables. The data included in the data store 220 may be, for example, data resulting from a particular process (e.g., hypothesis data and/or feedback data). Each database table arranges data in a series of columns (where each column represents an attribute of the data stored in the database) and rows (where each row represents attribute values). The data store 220 may be, for example, an object-oriented database that logically or physically organizes data into a series of objects. Each object may be associated with a series of attribute values. The data store 220 also may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The recommendation system 205 also includes the processor 230. The processor 230 may be a processor suitable for the execution of a computer program such as a general or special purpose microprocessor, and any one or more processors of any kind of digital computer. Generally, a processor receives instructions and data from a read-only memory or a random access memory or both. The processor 230 receives instructions and data from the components of the recommendation system 205 to, for example, output and store recommendations. In some implementations, the recommendation system 205 includes more than one processor.

The recommendation system 205 also includes the I/O device 240, which is configured to allow a user selection. For example, the I/O device 240 may be a mouse, a keyboard, a stylus, or any other device that allows a user to input data into the recommendation system 205 or otherwise communicate with the recommendation system 205. In some implementations, the user may be a machine and the user input may be received from an automated process running on the machine. In other implementations, the user may be a person. The I/O device 240 also may include a device configured to output recommendation data.

The recommendation system 205 also includes the controller 250. The controller 250 is an interface to a process. The controller 250 may receive feedback from the process, such as feedback data related to success of recommendations. The controller 250 also may cause changes in the system in response to the feedback, such as, for example, validating or adapting hypothesis data.

The recommendation system 205 also includes a memory 260. The memory 260 may be any type of machine-readable storage medium. The memory 260 may, for example, store the data included in the data store 220. In some implementations, the memory 260 may store instructions that, when executed, cause the system 205 to provide recommendations using a hypothesis and adapt the hypothesis based on feedback data.

Although the example recommendation system 205 is shown as a single integrated component, one or more of the modules and applications included in the recommendation system 205 may be implemented separately from the system 205 but in communication with the system 205. For example, the data store 220 may be implemented on a centralized server that communicates and exchanges data with recommendation 205.

Figure 3:
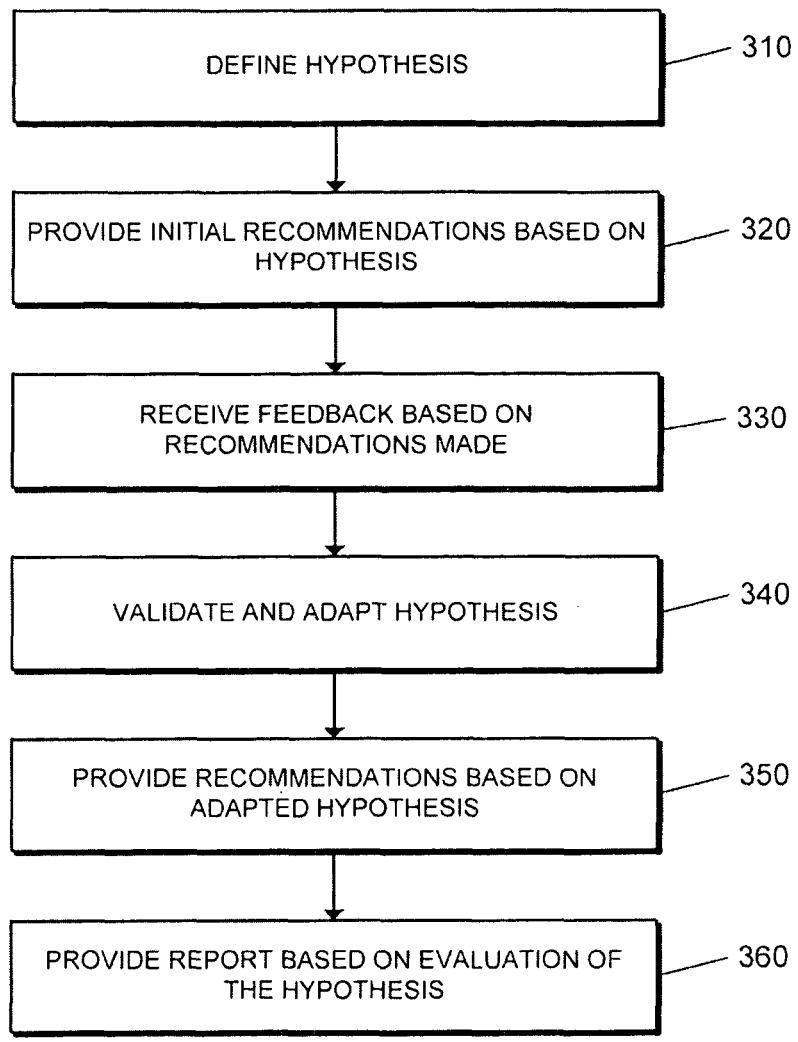
FIGS. 3, 4, and 6 are flowcharts of exemplary processes.

FIG. 3 illustrates an example of a process 300 for providing recommendations based on a hypothesis. The operations of the process 300 are described generally as being performed by the recommendation system 205. In some implementations, operations of the process 300 may be performed by one or more processors included in one or more electronic devices and may be performed by the system 100 described with respect to FIG. 1.

The system 205 defines a hypothesis (310). For example, the system may define a set of one or more criteria that represent criteria predicted to be relevant to the output or offer being recommended. The one or more criteria may be attributes of a user to which the output or offer is being presented (e.g., gender, age, income, etc.), attributes of an environment in which the output or offer is being presented (e.g., telephone, in person, computer, etc.), or any other attributes that may impact or may be correlated with success of a particular recommendation. The system 205 may define the hypothesis such that a combination (e.g., all) of criteria are needed to satisfy the hypothesis or that any one or more of a set of criteria satisfies the hypothesis. The system 205 may discover the relevant combinations when evaluating the hypothesis. The system 205 may use any combination of logic operators and criteria in defining a hypothesis.

The system 205 provides initial recommendations based on hypothesis (320). For instance, the system 205 uses the one or more criteria defined by the hypothesis to evaluate potential recommendations. In evaluating potential recommendations, the system 205 may compare attributes of a specific situation (e.g., attributes of a customer that is in a position to receive an offer, attributes of an environment in which an offer may be presented, etc.) to the criteria defined by the hypothesis and provide the output associated with the hypothesis as a recommendation when the attributes of the specific situation match the hypothesis. The system 205 also may compare the attributes of the specific situation to multiple hypotheses, identify the hypothesis that best matches the attributes of the specific situation, and recommend the output (e.g., offer) associated with the identified hypothesis. The system 205 initially provides recommendations using the hypothesis because feedback data associated with the hypothesis has not been received or is not conclusive as to whether the hypothesis needs adaptation.

The system 205 receives feedback based on recommendations made (330). The feedback may indicate whether the recommendations made were successful. For example, the system 205 may output recommended offers to present to customers and the system 205 may receive feedback regarding whether the offers presented to customers were accepted by the customers. The feedback also may include attributes of the specific situation in which the offers were presented (e.g., attributes of the customer to which the offer was presented, attributes of the environment in which the offer was presented, etc.). The feedback further may include data that is relevant to recommendations, but that is not a direct result of a recommendation (e.g., the feedback may be that a customer with particular attributes purchased a product corresponding to an offer for which a hypothesis has been set, even though the purchase was not made in response to a recommendation provided by the system 205).

The system 205 validates and adapts the hypothesis (340). The system 205 may analyze the received feedback and determine whether the hypothesis is correct by comparing the feedback data with the hypothesis. The system may use data mining and statistic techniques to determine whether the correlations between the criteria defined in the hypothesis and the recommended output actually exist. When the system 205 determines that the hypothesis is correct (e.g., correlations between criteria defined in the hypothesis and acceptance of the recommend output do exist), the system 205 validates the hypothesis and continues to provide recommendations based on the hypothesis as originally defined. When the system 205 determines that the hypothesis is not correct (e.g., correlations between criteria defined in the hypothesis and acceptance of the recommend output do not exist), the system 205 adapts the hypothesis based on the feedback received in response to the recommendations initially provided using the hypothesis.

In some implementations, the system 205 may account for aging of experience data such that a time with which the experience/feedback data was received is considered in validating and adapting the hypothesis. In these implementations, the system 205 may give more weight to feedback data that is more recent in time, than feedback data that is older. In this regard, the impact of feedback data in validating and adapting the hypothesis may gradually diminish over time to enable validation and adaptation of the hypothesis to occur based on (or more heavily based on) current circumstances reflected in the most recent feedback data.

The system 205 may adapt the entire hypothesis or adapt portions of the hypothesis while validating other portions of the hypothesis. The system 205 may adapt the hypothesis by adding new criteria to the hypothesis, removing criteria from the hypothesis, and/or adjusting the logical operators used in evaluating the hypothesis (e.g., changing an AND operation to an OR operation or vice versa). The system 205 may validate and adapt the hypothesis using processes 400 and 600 described below with respect to FIGS. 4 and 6, respectively.

The system 205 provides recommendations based on adapted hypothesis (350). For instance, the system 205 uses the one or more criteria defined by the adapted hypothesis to evaluate potential recommendations. In evaluating potential recommendations, the system 205 may compare attributes of a specific situation (e.g., attributes of a customer that is in a position to receive an offer, attributes of an environment in which an offer may be presented, etc.) to the criteria defined by the adapted hypothesis and provide the output associated with the adapted hypothesis as a recommendation when the attributes of the specific situation match the adapted hypothesis.

The system 205 also may compare the attributes of the specific situation to multiple adapted hypotheses and initial hypotheses, identify the adapted or initial hypothesis that best matches the attributes of the specific situation, and recommend the output (e.g., offer) associated with the identified hypothesis. In selecting the adapted or initial hypothesis that best matches the attributes of the specific situation, the system 205 may give more weight to hypotheses that have been adapted (e.g., when both an initial hypothesis and an adapted hypothesis match the specific situation, the system may select the adapted hypothesis), may give more weight to hypotheses that have been adapted based on more feedback (e.g., when two adapted hypotheses match the specific situation, the system may select the hypothesis that has been used longer or received the most feedback), or may give more weight to hypotheses that have a higher correlation rate to the corresponding recommended output (e.g., when two adapted hypotheses match the specific situation, the system may select the hypothesis that has a higher rate of acceptance when the recommend output or offer is presented to a customer).

The system 205 provides a report based on evaluation of the hypothesis (360). The system 205 may generate the report based on feedback data and analytical analysis of the feedback data. For instance, the system 205 may compute statistical data that reflects an acceptance rate for each combination of criteria defined by the hypothesis. The report may provide insights about what combinations of criteria defined in the hypothesis worked and what were the acceptance rates of the combinations of criteria over time. The system 205 may send the report to a business user's system over a network or may directly display the report to a business user on a display device.

Figure 4:
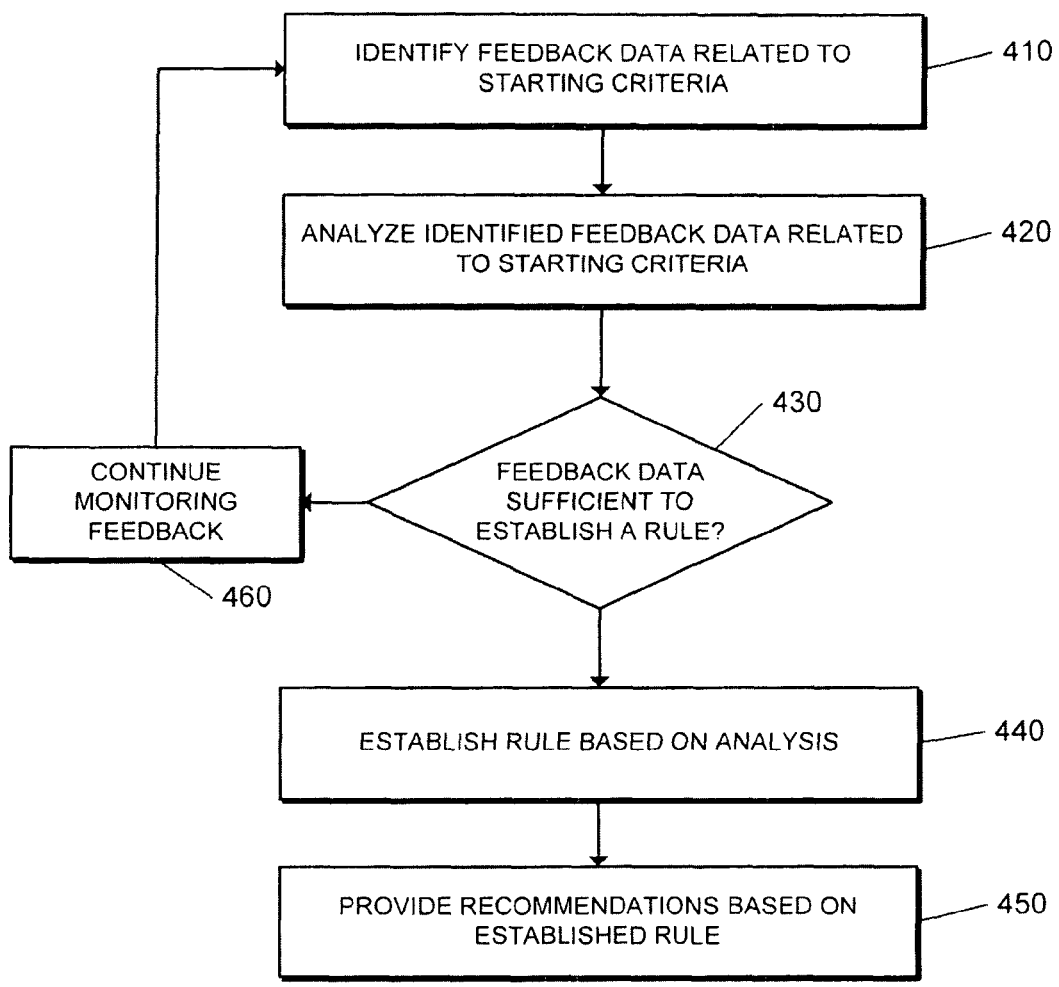

FIG. 4 illustrates an example of a process 400 for validating and adapting a hypothesis into a rule. The operations of the process 400 are described generally as being performed by the recommendation system 205. In some implementations, operations of the process 400 may be performed by one or more processors included in one or more electronic devices and may be performed by the system 100 described with respect to FIG. 1.

The system 205 identifies feedback data related to starting criteria defined by the hypothesis (410). For instance, the system 205 compares the feedback data to the stating criteria defined in the hypothesis and identifies the feedback data that is relevant to the hypothesis. By identifying feedback data that is relevant to the hypothesis, the system 205 may avoid analyzing the full universe of data and focus on validation of the hypothesis. This may result in increased performance and quicker identification of a rule that is confirmed by actual experience as compared to other data mining and analytical systems that do not start with and focus on a hypothesis.

The system 205 analyzes identified feedback data related to the starting criteria (420). The system 205 may analyze the identified feedback and determine whether the hypothesis is correct by comparing the identified feedback data with the hypothesis. The system may use data mining and statistic techniques to determine whether the correlations between the criteria defined in the hypothesis and the recommended output actually exist.

The system 205 determines whether the feedback data is sufficient to establish a rule (430). For example, the system 205 may determine whether enough feedback data has been received to represent a statistically significant sample. In this example, the system may determine that the feedback data is sufficient to establish a rule when a statistically significant sample of feedback data has been received.

In some implementations, the system 205 may determine whether the feedback data is reasonably conclusive to confirm or reject a hypothesis. For instance, the system 205 may determine that a threshold of greater than 40% acceptance of a recommended offer is conclusive to validate a hypothesis and that a threshold of less than 10% acceptance of a recommended offer is conclusive to reject a hypothesis. However, when the acceptance rate is between 10% and 40%, the system 205 may determine that the feedback data is not conclusive and, therefore, the feedback data is not sufficient to establish a rule.

The system 205 may determine whether the feedback data is sufficient with respect to portions of the hypothesis. For example, the system 205 may determine that the feedback data is sufficient for a first criterion defined by the hypothesis and also may determine that the feedback data is not sufficient for a second criterion defined by the hypothesis. In this example, the system 205 may process the first criterion in the hypothesis as having sufficient feedback data and process the second criterion in the hypothesis as lacking sufficient feedback data.

In response to a determination that the feedback data is sufficient to establish a rule, the system 205 establishes a rule based on the analysis (440). Because the hypothesis has received sufficient feedback data, the system 205 may establish a declarative rule based on the hypothesis and use the rule in a declarative approach to decision support or recommendation. The system 205 may establish a rule that accepts the entire hypothesis, accepts portions of the hypothesis, or accepts portions of the hypothesis and adds additional portions to the hypothesis. The system 205 may establish a rule that adds new criteria to the hypothesis, removes criteria from the hypothesis, and/or adjusts the logical operators used in evaluating the hypothesis (e.g., changing an AND operation to an OR operation or vice versa). For instance, when the hypothesis defines three criteria, the system 205 may define a rule that all three criteria are required to recommend the output or offer associated with the hypothesis, a combination of any two of the criteria are required to recommend the output or offer associated with the hypothesis, any one of the criteria are required to recommend the output or offer associated with the hypothesis, a specific one of the criteria is required to recommend the output or offer associated with the hypothesis, or different criteria (or a different combination of criteria that include one or more of the three criteria defined in the hypothesis) are required to recommend the output or offer associated with the hypothesis.

FIG. 5 illustrates an exemplary data set 500 that may be used in establishing a rule. As shown, the data set 500 corresponds to a hypothesis that includes three criteria (X, Y, and Z) and may be generated by the system 205 based on feedback data. The data set 500 includes a column 510 that indicates the criteria being evaluated, a column 520 that indicates an acceptance rate of recommended offers associated with the criteria identified in column 510, and a column 530 that indicates a decline rate of recommended offers associated with the criteria identified in column 510.

As shown, the data set 500 includes data for each possible combination of the criteria (X, Y, and Z) defined by the hypothesis. For instance, a row 540 corresponds to the situation in which only attribute X is met, a row 545 corresponds to the situation in which only attribute Y is met, a row 550 corresponds to the situation in which only attribute Z is met, a row 555 corresponds to the situation in which attributes X and Y are met, a row 560 corresponds to the situation in which attributes X and Z are met, a row 565 corresponds to the situation in which attributes Y and Z are met, and a row 570 corresponds to the situation in which attributes X, Y, and Z are met. Accordingly, using the data set 500, the system 205 may evaluate all possible combinations of the criteria defined by the hypothesis to establish a rule that achieves successful results.

In establishing a rule, the system 500 may establish a rule based on the combination of criteria that achieved the best result. In this case, the system 205 may establish a rule that criteria X and Z are required to recommend the output (e.g. offer) associated with the hypothesis because the combination of X and Z achieved the highest acceptance rate.

In another example, the system 500 may establish a rule based on whether one or more combinations of criteria have achieved a threshold level of success. A threshold of greater than or equal to a 40% acceptance rate (or less than or equal to a 60% decline rate) may be used to identify combinations of criteria to establish in a rule. In this example, the system 205 may establish a rule that the recommended output (e.g., offer) associated with the hypothesis is provided when the combinations of X only, Z only, and X and Z are met because each of these combinations achieved an acceptance rate of 40% or higher (or a decline rate of 60% or lower).

In a further example, the system 500 may establish a negative rule when one or more combinations of criteria have achieved less than a threshold level of success. A threshold of greater than or equal to a 90% decline rate (or less than or equal to a 10% acceptance rate) may be used to identify combinations of criteria to establish in a negative rule. In this example, the system 205 may establish a negative rule that the recommended output (e.g., offer) associated with the hypothesis is not provided when the combinations of Y only and Y and Z are met because each of these combinations achieved a decline rate of 90% or higher (or an acceptance rate of 10% or lower).

Referring again to FIG. 4, the system 205 provides recommendations based on the established rule (450). For instance, the system 205 uses the one or more criteria in the established rule to evaluate potential recommendations. In evaluating potential recommendations, the system 205 may compare attributes of a specific situation (e.g., attributes of a customer that is in a position to receive an offer, attributes of an environment in which an offer may be presented, etc.) to the criteria defined by the established rule and provide the output associated with the established rule as a recommendation only when the criteria of the specific situation match the established rule. In this regard, the established rule may be viewed as a declarative rule that must be met in order to provide the recommended output. The established rule may be used as a filter prior to evaluating an additional hypothesis or other criteria (e.g., similar to an eligibility rule discussed above) in determining whether to provide a particular recommendation. When a rule has been established the system 205 may discontinue monitoring feedback corresponding to the established rule and recommendations provided based on the established rule.

In response to a determination that the feedback data is not sufficient to establish a rule, the system 205 continues monitoring feedback data (460). The system 205 may continue to provide recommendations based on the hypothesis, continue to receive feedback in accordance with those recommendations, and continue to evaluate the received feedback to determine whether the feedback becomes sufficient to establish a rule. When the feedback data corresponding to the entire hypothesis is not sufficient, the system 205 continues to monitor feedback corresponding to the entire hypothesis. When the feedback data corresponding to a first portion of a hypothesis is not sufficient and the feedback data corresponding to a second portion of a hypothesis is sufficient, the system 205 continues to monitor feedback corresponding to the first portion of the hypothesis, but may not continue to monitor feedback corresponding to the second portion of the hypothesis.

Figure 6:
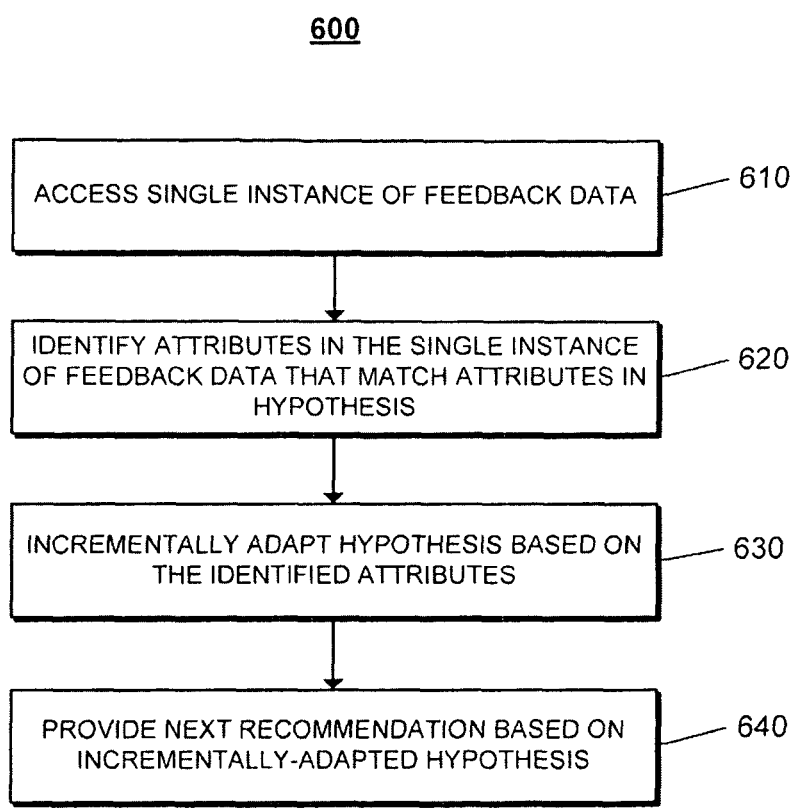

FIG. 6 illustrates an example of a process 600 for incrementally validating and adapting a hypothesis. The operations of the process 600 are described generally as being performed by the recommendation system 205. In some implementations, operations of the process 600 may be performed by one or more processors included in one or more electronic devices and may be performed by the system 100 described with respect to FIG. 1.

The system 205 accesses a single instance of feedback data (610). For instance, the system 205 may access the single instance of feedback data from electronic storage or may receive the single instance of feedback data from another electronic device (e.g., an application system) over a network. The single instance of feedback data may reflect a single response to a recommended offer or may reflect a relatively small number of responses to a recommended offer. The single instance of feedback data may be an incremental portion of feedback data that may be used to incrementally adapt a hypothesis and that is not sufficient to yield conclusive results in a data mining process.

The system 205 identifies attributes in the single instance of feedback data that match attributes in the hypothesis (620). For instance, the system 205 compares attributes of the single instance of feedback data to the attributes defined in the hypothesis and identifies the attributes of the single instance of feedback data that match attributes in the hypothesis.

The system 205 incrementally adapts the hypothesis based on the identified attributes and the feedback data (630). For example, the system 205 may adjust weightings used in evaluating the hypothesis based on the single instance of feedback data. In this example, the weightings may correspond to attributes defined by the hypothesis and the system 205 may adjust the weightings by increasing a weighting a relatively small amount for a particular attribute when the single instance of feedback data is positive with respect to the particular attribute and decreasing a weighting a relatively small amount for a particular attribute when the single instance of feedback data is negative with respect to the particular attribute. Over time, the weightings may level off and accurately reflect an evaluation of the hypothesis (e.g., a weighting may become zero when the attribute in the hypothesis does not have a correlation to the recommended output). Adapting the hypothesis incrementally may offer a benefit in that the hypothesis is continuously updated to reflect feedback received and, therefore, as the system 205 gathers enough feedback to sufficiently evaluate the hypothesis, attributes in the hypothesis that are incorrect have reduced impact and attributes in the hypothesis that are correct have increased impact.

FIG. 7 illustrates an exemplary data set 700 that may be used in incrementally adapting a hypothesis. As shown, the data set 700 corresponds to a hypothesis that includes three starting attributes (X, Y, and Z) 710. The initial hypothesis 720 gives a weighting of 1.0 to attribute X, a weighting of 0.5 to attribute Y, and weighting of 0.5 to attribute Z. Evaluation of the hypothesis involves adding the weighting corresponding to each matching attribute to arrive at a score. When the score is greater than or equal to 1.0, the recommendation is provided. For instance, based on the initial hypothesis, the recommendation is provided in situations with attribute X Only (score 1.0), attributes X and Y (score 1.5), attributes X and Z (score 1.5), attributes Y and Z (score 1.0), and attributes X, Y, and Z (score 2.0), but not in situations with attribute Y Only (score 0.5) and attribute Z Only (score 0.5). In addition, when a single instance of feedback indicates an acceptance of the recommend output (e.g., offer), the weighting corresponding to each of the matching attributes is increased by 0.1 and, when a single instance of feedback indicates a rejection of the recommend output (e.g., offer), the weighting corresponding to each of the matching attributes is decreased by 0.1. The example shown in FIG. 7 for applying a hypothesis and incrementally adapting the hypothesis is illustrative only and used for ease of explanation. Other types of processes and examples may be used in applying a hypothesis and incrementally adapting the hypothesis.

The data set 700 includes a column 730 that indicates an order of occurrence of situations in which the output (e.g., offer) corresponding to the hypothesis may be recommended, a column 740 that indicates identified attributes in the situation that match the hypothesis, a column 750 that indicates whether the output (e.g., offer) is recommended in the situation based on the matching attributes (e.g., whether the score computed by summing, the weightings of the matching attributes is greater than or equal to 1.0), a column 760 that indicates whether the output (e.g., offer) was accepted or declined based on feedback data, and a column 770 that indicates an incrementally adapted hypothesis that is used in the next situation in which the output (e.g., offer) corresponding to the hypothesis may be recommended. The processing of the data set 700 is apparent from FIG. 7 and the above explanation and is not described in further detail. As shown, the incrementally adapted hypothesis changes based on each instance of feedback received and the combinations of attributes that result in a recommendation being provided changes throughout. Over time, as shown in FIG. 7, the incremental adaptations to the hypothesis suggest that the initial predictions (e.g., weightings) with respect to attributes X and Z were relatively accurate (e.g., within 0.1) and that the initial prediction (e.g., weighting) with respect to attribute Y was relatively low and has been adjusted to a higher value.

In some examples, the system 205 may assign a weighting to each combination of attributes in a hypothesis such that feedback related to combinations of attributes may be tracked. For instance, each combination of attributes may be associated with a separate predictor and all of the predictors may start at the same value (e.g., the example discussed in FIG. 7 may include an X predictor, a Y predictor, a Z predictor, an X-Y predictor, an X-Z predictor, a Y-Z predictor, and an X-Y-Z predictor). When the system 205 receives feedback data that relates to a particular combination of attributes, the system 205 incrementally updates the predictor associated with that combination of attributes based on the feedback data (e.g., using techniques similar to those discussed above with respect to FIG. 7). For example, when the system 205 receives feedback data related to the combination of attributes X and Z, the system 205 incrementally updates an X-Z predictor to account for the feedback data related to the combination of attributes X and Z. In some implementations, the feedback data related to the combination of attributes X and Z also may cause an X predictor and a Z predictor to be incrementally updated to account for the feedback data because each of these combination of attributes is covered by the combination of attributes X and Z.

In some examples, when the recommendation and feedback analysis begins, none of the predictors associated with the combinations of attributes are used to impact the recommendation process. Instead, the system 205 monitors feedback data related to the particular combinations of attributes as recommendations are provided to the general population of eligible users without regard for the predictors. As the system 205 analyzes the feedback data, the system 205 determines whether any one or more of the combinations of attributes is correlated to acceptance of the recommendation in a statistically significant manner. When the system 205 identifies one or more combinations of attributes that are correlated to acceptance of the recommendation in a statistically significant manner, the system 205 begins using the one or more predictors associated with the identified one or more combinations of attributes to influence the recommendation process. For instance, the system 205 begins using the predictors or weightings associated with the identified combinations of attributes when those attributes are confirmed as being correlated to acceptance of the recommendation. The system 205 may continue to monitor feedback associated with all of the combinations of attributes or may continue to monitor feedback data for only the identified combinations of attributes determined to be correlated to acceptance of the recommendation.

Referring again to FIG. 6, the system 205 provides a next recommendation based on the incrementally-adapted hypothesis (640). For instance, the system 205 uses the one or more criteria and corresponding weighting values in the incrementally-adapted hypothesis to evaluate potential recommendations. In evaluating potential recommendations, the system 205 may compare attributes of a specific situation (e.g., attributes of a customer that is in a position to receive an offer, attributes of an environment in which an offer may be presented, etc.) to the criteria defined by the incrementally-adapted hypothesis and provide the output associated with the incrementally-adapted hypothesis as a recommendation when the adapted weightings corresponding to the matched criteria satisfy a recommendation rule. In this regard, the incrementally-adapted hypothesis may change over time and provide a recommendation that reflects a current state of the feedback data received to date, even though the feedback back data may not present conclusive results as to the accuracy of the initial hypothesis.

Figure 8:
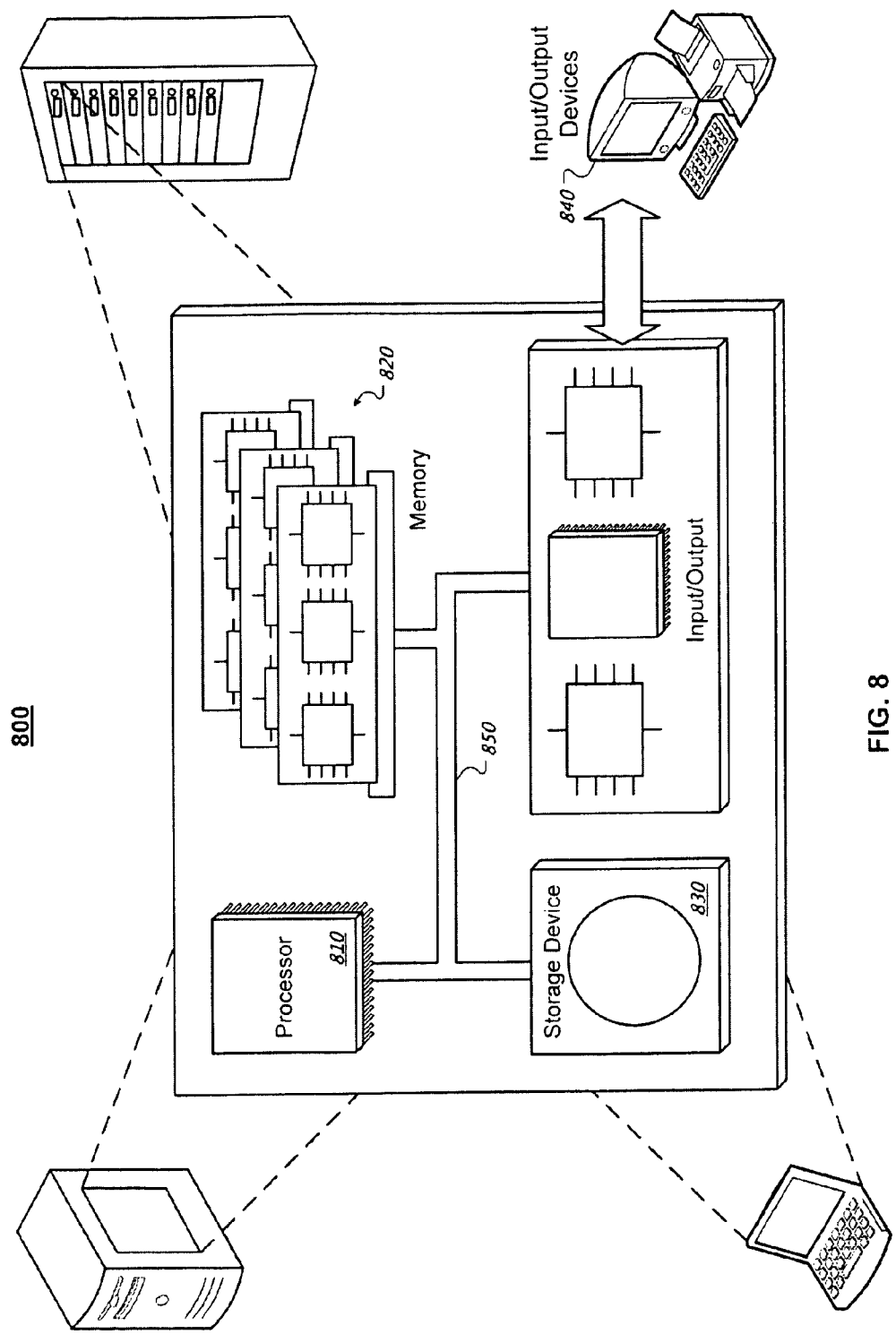

FIG. 8 is a schematic diagram of a generic computer system 800. The system 800 can be used for the operations described in association with any of the computer-implemented methods described previously. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable storage medium. In one implementation, the memory 820 is a volatile memory unit. In another implementation, the memory 820 is a non-volatile memory unit.

The storage device 830 is capable of providing mass storage for the system 800. In some implementation, the storage device 830 is a computer-readable storage medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or all Internet browser, or any combination of them. The components of the system can be connected by any form or medium of digital data communication such as a communication network. Examples of communication networks include. e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A statistical machine learning system comprising:
an input module configured to receive user input that defines a hypothesis associated with a particular output, the hypothesis defining, based on an existing business knowledge associated to a purchasing process of a product, one or more starting criteria that are proposed as being correlated with the particular output;
at least one non-transitory computer-readable storage medium coupled to one or more processors configured to store data representative of the hypothesis defined by the user input;
a recommendation engine configured to access the data representative of the hypothesis and provide, during a first period of time, a recommendation to a first plurality of customers, the recommendation comprising the particular output based on the one or more starting criteria defined by the hypothesis; and
an experience analytics system configured to perform operations comprising:
receiving, from an application system, feedback data based on the one or more starting criteria defined by the hypothesis, the feedback data comprising a percentage of customers from the first plurality of customers accepting the recommendation and indicating that the hypothesis is to be adapted based on the percentage exceeding a first threshold and based on the percentage being below a second threshold,
receiving, from the application system, relevant data indicating that one or more starting criteria are correlated with the particular output, the relevant data not being a direct result of the recommendation, and
modifying the hypothesis based on the relevant data and on the feedback data by one or more of adding an updated criteria to the one or more starting criteria and removing one starting criteria from the one or more starting criteria,
wherein the recommendation engine is further configured to provide, during a second period of time that is subsequent to the first period of time, an updated recommendation to a second plurality of customers, the updated recommendation comprising the particular output based on the modified hypothesis.

2. The system of claim 1 wherein:
the experience analytics system is configured to modify the hypothesis based on the relevant data and on the feedback data received from the application system by, in response to a determination that a particular combination of starting criteria is correlated with the particular output, using a particular combination of criteria; and
the recommendation engine is configured to provide the updated recommendation comprising the particular output based on modifying the hypothesis by providing the updated recommendation using the particular combination of criteria.

3. The system of claim 1 wherein:
the experience analytics system is configured to modify the hypothesis based on the relevant data and on the feedback data received from the application system by, in response to a determination that a particular starting criterion is not correlated with the particular output, removing the particular starting criterion from the hypothesis; and
the recommendation engine is configured to provide the updated recommendation comprising the particular output based on modifying the hypothesis by providing the updated recommendation without regard for the particular starting criterion removed from the hypothesis.

4. The system of claim 1 wherein:
the input module is further configured to receive the user input that defines one or more declarative rules associated with the particular output, the one or more declarative rules defining one or more required criteria that is different than the one or more starting criteria defined by the hypothesis and that is required to be met in order to provide the recommendation comprising the particular output, and
the recommendation engine is configured to provide the recommendation comprising the particular output conditioned on the one or more required criteria being met.

5. The system of claim 4 wherein the recommendation engine is configured to provide the recommendation comprising the particular output conditioned on the one or more required criteria being met by providing the recommendation based on the one or more starting criteria defined by the hypothesis only when the one or more required criteria are met.

6. The system of claim 1 wherein:
the experience analytics system is configured to modify the hypothesis based on the relevant data and on the feedback data received from the application system by:
identifying, from the feedback data and the relevant data, a portion of the feedback data related to the one or more starting criteria defined by the hypothesis;
analyzing the portion of the feedback data related to the one or more starting criteria defined by the hypothesis;
in response to analyzing, determining whether the portion of the feedback data is sufficient to establish a rule related to the one or more starting criteria defined by the hypothesis;

in response to a determination that the portion of the feedback data is sufficient to establish a rule related to the one or more starting criteria defined by the hypothesis, establishing a rule for providing the updated recommendation associated with the particular output based on the analysis; and in response to a determination that the portion of the feedback data is not sufficient to establish a rule related to the one or more starting criteria defined by the hypothesis, at least continuing to monitor feedback data that is received from the application system and that is related to whether the recommendation provided based on the one or more starting criteria defined by the hypothesis were successful, and the recommendation engine is configured to provide the updated recommendation comprising the particular output based on modifying the hypothesis by, in response to a determination that the portion of the feedback data is sufficient to establish a rule related to the one or more starting criteria defined by the hypothesis, providing the updated recommendation comprising the particular output based on the rule.

7. The system of claim 1 wherein:

the experience analytics system is configured to modify the hypothesis based on the relevant data and on the feedback data received from the application system by:

accessing a single instance of feedback data from the relevant data or the feedback data;

identifying one or more criteria in the single instance of feedback data that match the one or more starting criteria defined by the hypothesis; and incrementally modifying the hypothesis based on the one or more criteria in the single instance of feedback data that match the one or more starting criteria defined by the hypothesis, and the recommendation engine is configured to provide the updated recommendation comprising the particular output based on modifying the hypothesis by providing a next recommendation based on incrementally modifying the hypothesis.

8. The system of claim 1 wherein:

the input module is configured to receive the user input that defines a hypothesis associated with a particular output by receiving the user input that defines a hypothesis associated with a particular offer, the hypothesis defining one or more starting user attributes that are proposed as being correlated with user acceptance of the particular offer;

the recommendation engine is configured to provide, during the first period of time, the recommendation comprising the particular output based on the one or more starting criteria defined by the hypothesis by:

accessing attributes of a user available to receive an offer;

comparing the accessed attributes of the user to the one or more starting user attributes defined by the hypothesis;

based on comparison results, determining whether at least a portion of the accessed attributes of the user match at least a portion of the one or more starting user attributes defined by the hypothesis; and providing the particular offer to the user in response to a determination that at least a portion of the accessed attributes of the user match at least a portion of the one or more starting user attributes defined by the hypothesis;

the experience analytics system is configured to receive, from the application system, feedback data related to whether the recommendation provided based on the one or more starting criteria defined by the hypothesis were successful by receiving, from the application system, feedback data related to whether the user accepted the particular offer;

the experience analytics system is configured to modify the hypothesis based on the relevant data and on the feedback data received from the application system by modifying the hypothesis based on whether the user accepted the particular offer and the attributes of the user, and based on whether the relevant data shows that a customer, from the first plurality of customers, having the starting user attributes made a purchase corresponding to the particular offer, wherein the purchase was not made in response to the particular offer.

9. A computer-implemented method of statistical machine learning comprising:

receiving, by one or more processors, a user input that defines a hypothesis associated with a particular output, the hypothesis defining, based on an existing business knowledge associated to a purchasing process of a product, one or more starting criteria that are proposed as being correlated with the particular output;

storing, by the one or more processors, in a non-transitory computer-readable storage medium coupled to the one or more processors, data representative of the hypothesis defined by the user input;

providing, by the one or more processors, during a first period of time, a recommendation to a first plurality of customers, the recommendation comprising the particular output based on the one or more starting criteria defined by the hypothesis;

receiving, by the one or more processors, from an application system, feedback data based on the one or more starting criteria defined by the hypothesis, the feedback data comprising a percentage of customers from the first plurality of customers accepting the recommendation and indicating that the hypothesis is to be adapted based on the percentage exceeding a first threshold and based on the percentage being below a second threshold;

receiving, by the one or more processors and from the application system, relevant data indicating that one or more starting criteria are correlated with the particular output, the relevant data not being a direct result of the recommendation;

modifying, by the one or more processors the hypothesis based on the relevant data and on the feedback data by one or more of adding an updated criteria to the one or more starting criteria and removing one starting criteria from the one or more starting criteria; and providing, by the one or more processors, during a second period of time that is subsequent to the first period of time, an updated recommendation to a second plurality of customers, the updated recommendation comprising the particular output based on the modified hypothesis.

10. The computer-implemented method of claim 9 wherein:

modifying the hypothesis based on the relevant data and on the feedback data received from the application system further comprises, in response to a determination that a particular combination of starting criteria is correlated with the particular output, using the particular combination of criteria; and
providing the updated recommendation comprising the particular output based on the modified hypothesis comprises providing the updated recommendation using the particular combination of criteria.

11. The computer-implemented method of claim 9 wherein:
modifying the hypothesis based on the relevant data and on the feedback data received from the application system further comprises, in response to a determination that a particular starting criterion is not correlated with the particular output, removing the particular starting criterion from the hypothesis; and
providing the updated recommendation comprising the particular output based on the modified hypothesis comprises providing the updated recommendation without regard for the particular starting criterion removed from the hypothesis.

12. The computer-implemented method of claim 9 further comprising:
receiving the user input that defines one or more declarative rules associated with the particular output, the one or more declarative rules defining one or more required criteria that is different than the one or more starting criteria defined by the hypothesis and that is required to be met in order to provide a recommendation including the particular output,
wherein providing the updated recommendation comprises providing the updated recommendation comprising the particular output conditioned on the one or more required criteria being met.

13. The computer-implemented method of claim 12 wherein providing the updated recommendation comprising the particular output conditioned on the one or more required criteria being met comprises providing the updated recommendation based on the one or more starting criteria defined by the hypothesis only when the one or more required criteria are met.

14. The computer-implemented method of claim 9 wherein:
modifying the hypothesis based on the relevant data and on the feedback data received from the application system:
identifying, from the feedback data and the relevant data, a portion of the feedback data related to the one or more starting criteria defined by the hypothesis;
analyzing the portion of the feedback data related to the one or more starting criteria defined by the hypothesis;
based on the analysis, determining whether the portion of the feedback data is sufficient to establish a rule related to the one or more starting criteria defined by the hypothesis;
in response to a determination that the portion of the feedback data is sufficient to establish a rule related to the one or more starting criteria defined by the hypothesis, establishing a rule for providing the updated recommendation associated with the particular output based on the analysis; and
in response to a determination that the portion of the feedback data is not sufficient to establish a rule related to the one or more starting criteria defined by the hypothesis, at least continuing to monitor feedback data that is received from the application system and that is related to whether the updated recommendation provided based on the one or more starting criteria defined by the hypothesis were successful, and
providing the updated recommendation comprising the particular output based on the modified hypothesis comprises, in response to a determination that the portion of the feedback data is sufficient to establish a rule related to the one or more starting criteria defined by the hypothesis, providing the updated recommendation comprising the particular output based on the rule.

15. The computer-implemented method of claim 9 wherein:
modifying the hypothesis based on the relevant data and on the feedback data received from the application system:
accessing a single instance of feedback data from the relevant data or the feedback data;
identifying one or more criteria in the single instance of feedback data that match the one or more starting criteria defined by the hypothesis; and
incrementally modifying the hypothesis based on the one or more criteria in the single instance of feedback data that match the one or more starting criteria defined by the hypothesis, and
providing the updated recommendation comprising the particular output based on the modified hypothesis comprises providing a next recommendation based on the incrementally-modified hypothesis.

16. The computer-implemented method of claim 9 wherein:
receiving the user input that defines a hypothesis associated with a particular output comprises receiving the user input that defines a hypothesis associated with a particular offer, the hypothesis defining one or more starting user attributes that are proposed as being correlated with user acceptance of the particular offer;
providing, during the first period of time, the recommendation comprising the particular output based on the one or more starting criteria defined by the hypothesis comprises:
accessing attributes of a user available to receive an offer;
comparing the accessed attributes of the user to the one or more starting user attributes defined by the hypothesis;
based on comparison results, determining whether at least a portion of the accessed attributes of the user match at least a portion of the one or more starting user attributes defined by the hypothesis; and
providing the particular offer to the user in response to a determination that at least a portion of the accessed attributes of the user match at least a portion of the one or more starting user attributes defined by the hypothesis;
receiving, from the application system, feedback data related to whether the recommendation provided based on the one or more starting criteria defined by the hypothesis were successful comprises receiving, from the application system, feedback data related to whether the user accepted the particular offer;
modifying the hypothesis based on the relevant data and on the feedback data received from the application system comprises modifying the hypothesis based on whether the user accepted the particular offer and the attributes of the user, and based on whether the relevant data shows that a customer, from the first plurality of customers, having the starting user attributes made a purchase corresponding to the particular offer, wherein the purchase was not made in response to the particular offer.

17. A non-transitory computer-readable storage medium coupled to one or more processors and having instructions stored thereon which, when executed by the one or more processors, cause the one or more processors to perform operations comprising:
receiving a user input that defines a hypothesis associated with a particular output, the hypothesis defining, based on an existing business knowledge associated to a purchasing process of a product, one or more starting criteria that are proposed as being correlated with the particular output;
storing, in electronic storage, data representative of the hypothesis defined by the user input;
providing, during a first period of time, a recommendation to a first plurality of customers, the recommendation comprising the particular output based on the one or more starting criteria defined by the hypothesis;
receiving, from an application system, feedback data based on the one or more starting criteria defined by the hypothesis, the feedback data comprising a percentage of customers from the first plurality of customers accepting the recommendation and indicating that the hypothesis is to be adapted based on the percentage exceeding a first threshold and based on the percentage being below a second threshold;
receiving, from the application system, relevant data indicating that one or more starting criteria are correlated with the particular output, the relevant data not being a direct result of the recommendation;
modifying, by the one or more processors, the hypothesis based on the relevant data and on the feedback data by one or more of adding an updated criteria to the one or more starting criteria and removing one starting criteria from the one or more starting criteria; and
providing, during a second period of time that is subsequent to the first period of time, an updated recommendation to a second plurality of customers, the updated recommendation comprising the particular output based on the modified hypothesis.

18. The non-transitory computer-readable storage medium of claim 17 wherein:
receiving the user input that defines a hypothesis associated with a particular output comprises receiving the user input that defines a hypothesis associated with a particular offer, the hypothesis defining one or more starting user attributes that are proposed as being correlated with user acceptance of the particular offer;
providing, during the first period of time, the recommendation comprising the particular output based on the one or more starting criteria defined by the hypothesis comprises:
accessing attributes of a user available to receive an offer;
comparing the accessed attributes of the user to the one or more starting user attributes defined by the hypothesis;
based on comparison results, determining whether at least a portion of the accessed attributes of the user match at least a portion of the one or more starting user attributes defined by the hypothesis; and
providing the particular offer to the user in response to a determination that at least a portion of the accessed attributes of the user match at least a portion of the one or more starting user attributes defined by the hypothesis;
receiving, from the application system, feedback data related to whether the recommendation provided based on the one or more starting criteria defined by the hypothesis were successful comprises receiving, from the application system, feedback data related to whether the user accepted the particular offer;
modifying the hypothesis based on the relevant data and on the feedback data received from the application system comprises modifying the hypothesis based on whether the user accepted the particular offer and the attributes of the user, and based on whether the relevant data shows that a customer, from the first plurality of customers, having the starting user attributes made a purchase corresponding to the particular offer, wherein the purchase was not made in response to the particular offer.

* * * * *